Nov. 20, 1962 R. J. WERTEPNY, SR., ETAL 3,064,350
GRASS CUTTING SHEARS
Filed June 9, 1959 2 Sheets-Sheet 1
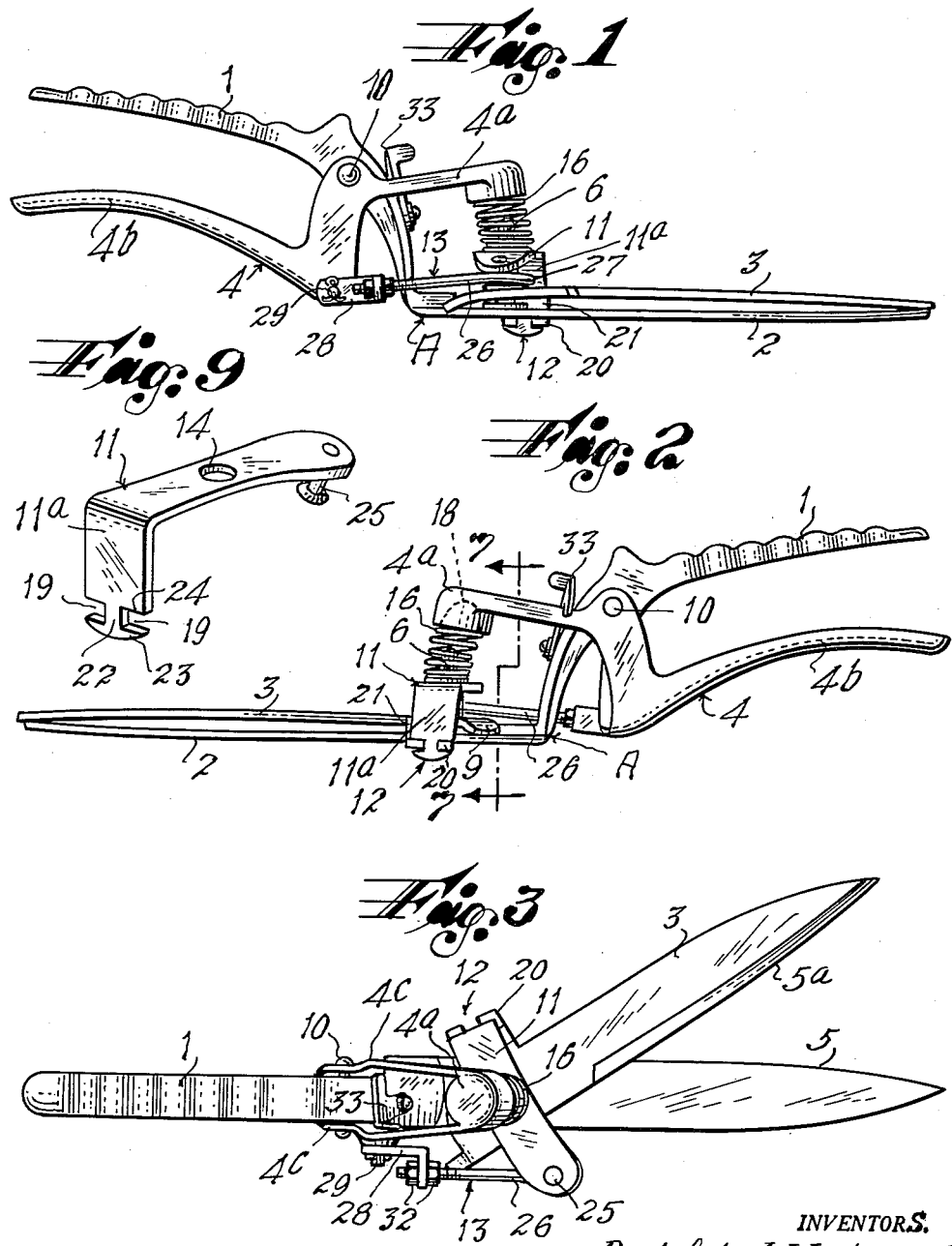
INVENTORS.
Rudolph J. Wertepney, Sr.
Bernard G. McAteer
BY
Harry B. Cook,
ATTORNEY

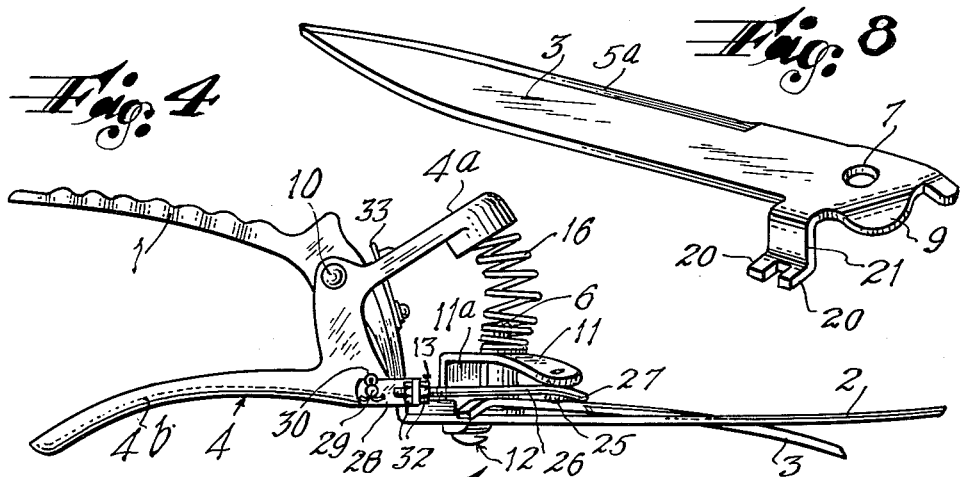
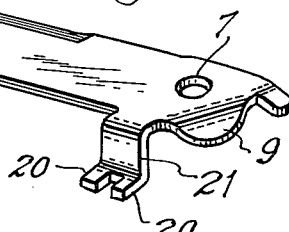
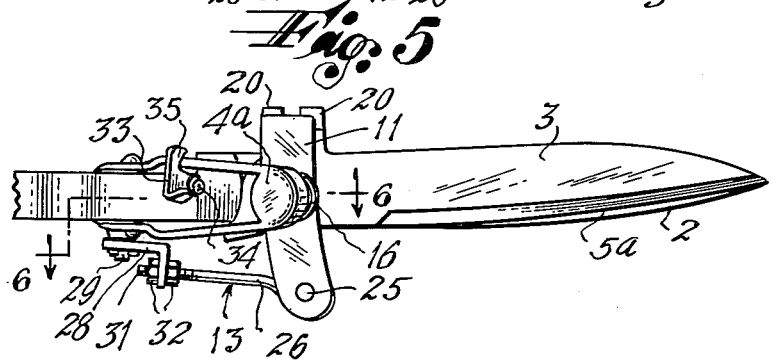
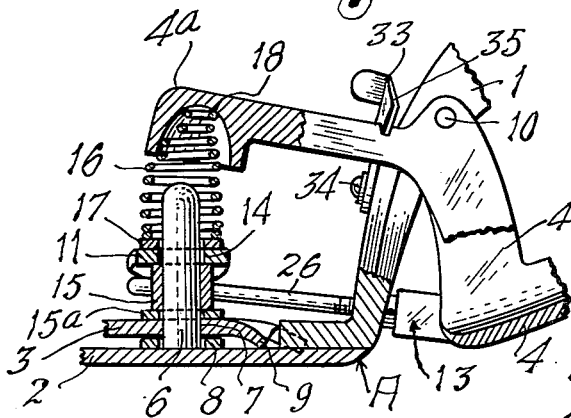
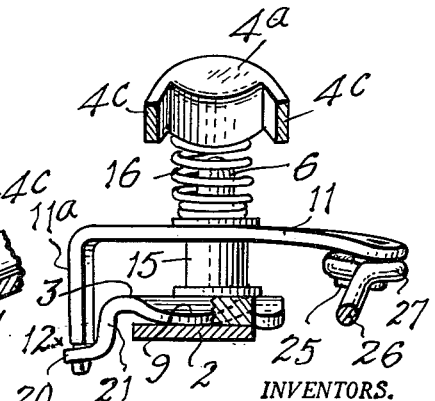

United States Patent Office 3,064,350
Patented Nov. 20, 1962

3,064,350
GRASS CUTTING SHEARS
Rudolph J. Wertepny, Sr., West Orange, and Bernard G. McAteer, Rockaway, N.J., assignors to J. Wiss & Sons Co., Newark, N.J., a corporation of New Jersey
Filed June 9, 1959, Ser. No. 819,162
16 Claims. (Cl. 30—248)

This invention relates in general to shears, and the invention is more particularly directed to improvements in grass shears having a main section comprising an integral or rigidly connected handle and cutting blade, a movable blade pivotally mounted on said section, and a second handle pivotally mounted on said section for actuating the movable blade.

A primary object of the invention is to provide a shears of this character which shall include a novel and improved means for mounting the movable blade on the main section, and a novel and improved actuating means for the movable blade whereby the contact pressure between the cutting edges of the blades shall increase with the pressure incident to moving the movable blade relative to the other blade during shearing operation.

Another object is to provide in such a shears, a novel and improved construction and combination of means for mounting the blade and means for actuating the blade such that the movable blade shall be canted relative to and pressed toward the fixed blade during the shearing movement of the movable blade so that upon an increase in the resistance to relative movement of the blades, as by thick plant stem between the cuting edges, the pressure between the blades shall be greatly increased to overcome such resistance and provide great force adjacent the points of the blades with a minimum of effort on the part of the operator of the shears.

A further object is to provide a novel and improved construction and combination of a mounting for the movable blade on the main section, the second handle pivotally mounted on the main section, a lever and link connection between the second handle and the movable blade, and a spring for simultaneously biasing the second handle into its normal or retracted position, yieldingly pressing the movable blade toward the fixed blade and serving as a nut for holding the lever of said lever and link connection in proper position with respect to the pivotal connection of the lever to the fixed blade, whereby the shears can be easily and quickly assembled and disassembled and the movable blade shall efficiently cooperate with the fixed blade during shearing operation.

Still another object is to provide a shears of this character wherein the actuating means for the movable blade shall include a lever pivotally mounted intermediate its ends on a pivot stud on the fixed blade and connected to the second handle and to the rear edge portion of the movable blade in a novel and improved manner, whereby upon relative pivotal movement of the handles in one direction, the movable blade shall be tilted or canted, and at the same time, pulled toward the movable blade to provide shearing contact of the edges of the blades with great force and with a minimum of effort on the part of the operator of the shears.

Other objects, advantages and results of the invention will be brought out by the following description in conjunction with the accompanying drawings in which FIGURE 1 is a side elevation of a grass shears embodying the invention, showing the relative positions of the parts at the end of a shearing operation;

FIGURE 2 is an elevation of the side of the shears opposite that shown in FIGURE 1 with the parts in the same relative positions;

FIGURE 3 is a top plan view of the shears, showing the blades in normal, retracted, or rest position;

FIGURE 4 is a side elevation of the shears similar to FIGURE 1 but showing the relative positions of the parts in the normal, retracted, or rest position illustrated in FIGURE 3;

FIGURE 5 is a fragmentary top plan view of the shears as illustrated in FIGURE 1, showing the blades and associated parts illustrated in FIGURE 1;

FIGURE 6 is an enlarged fragmentary central vertical sectional view approximately on the plane of the line 6—6 of FIGURE 5 with portions shown in elevation;

FIGURE 7 is an enlarged transverse vertical sectional view approximately on the plane of the line 7—7 of FIGURE 2;

FIGURE 8 is a detached perspective view of the movable blade; and

FIGURE 9 is a detached perspective view of the actuating lever for the movable blade.

Specifically describing the illustrated embodiment of the invention, the shears comprises a main section A which includes a handle 1 and a blade 2 rigidly secured to the handle in any suitable manner, for example, by welding or by rivets. Pivotally associated with the main section are a movable blade 3 and a second handle 4 for operating it, the said blades having cutting edges 5 and 5a, respectively, that are cooperative for performing shearing operations, particularly for cutting grass.

More specifically describing the invention, the main section has a fixed pivot stud 6 rigidly secured thereon and projecting upwardly from the fixed blade 2 as best shown in FIGURE 6. The movable blade 3 has a pivot opening 7 therein through which loosely passes the stud 6, there being a spacing washer 8 between the movable blade and the fixed blade and the movable blade having a downwardly curved and inclined rear edge or heel 9 that rides on the upper surface of the rear portion of the fixed blade upon relative pivotal movement of the blades, said heel 9 tending to tilt the movable blade relative to the fixed blade in known manner during the shearing action of the blades.

As hereinbefore indicated, the movable blade is operated by the second handle 4 that is pivotally mounted at 10 on the main handle, and as shown, an actuating lever 11 is loosely pivotally mounted on the stud 6 and has one end rockably connected at 12 to the rear edge portion of the movable blade and its other end connected by linkage at 13 to the second handle. More particularly describing the construction, the actuating lever 11 has a pivot opening 14 through which loosely passes the stud 6, and between the lever and the movable blade are a spacing sleeve 15 and a washer 15a that are slidable on the stud, while above the actuating lever is a helical compression spring 16, one end of which bears on the upper side of the lever through a washer 17 and the other end of which is removably seated in a socket 18 on the underside of an arm 4a that projects from the second handle 4 at the side of the pivot 10 opposite the grip portion 4b. The spring 16 is normally under compression so as to press the actuating lever, spacing sleeve, and washers against the movable blade and the movable blade against the fixed blade, and at the same time, bias the second handle into its normal, retracted position shown in FIGURE 3. The spring thus serves the dual function of a nut for holding a lever, spacers and movable blade in position on the stud and also to bias the second handle to its normal position.

The connection 13 of the actuating lever to the movable blade is shown as comprising an arm 11a that projects at approximately right angles to the main portion of the lever 11 and has aligned notches 19 in its opposite edges that loosely receive spaced lugs 20 on an arm 21 that extends from the rear edge of the movable blade toward the fixed blade adjacent the pivotal connection of the movable blade to the stud 6 and substantially below the plane of engagement of the cutting edges of the blades as best shown in FIGURES 2 and 7. Describing the construction another way, the arm 11a of the lever 11 has a reduced neck portion 22 on the outer end of which is a head 23, the neck portion being loosely disposed between the lugs 20 of the movable blade and the head portion 23 underlying the lugs 20 at the side thereof opposite shoulders 24 on the arm 11a. This connection between the lever 11 and the movable blade is rockable, that is, the lever and the lugs 20 may have limited relative movement in all directions.

The connection 13 between the lever and the second handle comprises a pivot pin 25 rigidly mounted in the end portion of the lever opposite the arm 11a as best shown in FIGURES 7 and 9, and desirably, the stud is inclined forwardly toward the tips of the blades and laterally inwardly toward the pivot stud 6. A wire link section 26 has an eye 27 at one end thereof loosely pivotally connected to said stud and its other end adjustably connected to an angle link section 28 that is, in turn, pivotally connected to a stud 29 on the second handle 4 and preferably detachably held in position by a cotterpin 30. The adjustable connection between the link sections is shown as comprising a threaded portion 31 of the wire link passing through an opening in the angle section 28 with nuts 32 threaded on the wire section at opposite sides of the angle section.

It is desirable to provide a catch or latch cooperative with the handle portions for holding the blades in aligned overlapping position as best shown in FIGURES 2, 5 and 6, and for this purpose, we have shown a sheet metal catch 33 pivotally connected at one end to the main section as at 34 and having a lateral hooked portion 35 to engage over one side of the arm 4a of the second handle that is shown as formed of two parallel portions 4c that straddle the main handle portion 1.

In operation of the shears, upon release of the second handle 4 from the catch 33, the spring 16 will swing the said handle into its retracted position as shown in FIGURE 4, and at the same time, the blades will be swung apart as shown in FIGURE 3. Upon squeezing of the handles together against the influence of the spring 16, the movable blade is pivotally swung toward the fixed blade and the cutting edges 5 and 5a are brought into cutting engagement with each other. At the same time, the spring 16 presses the movable blade against the fixed blade to insure effective but easy slidable shearing action of the blades upon each other, but should unusually great resistance to relative sliding of the blades be encountered, for example, by the interposition of a thick weed stem between the blades, the force exerted on the second handle through the linkage 13, the pivot pin 25, and the rockable connection 12 of the lever 11 with the movable blade, will cant the movable blade and, at the same time, press the movable blade against the fixed blade so as to resist tendency of the blades to separate and to insure a proper contact pressure between the cutting edges during the shearing operation. It will be noted that the force applied to the actuating lever from the second handle exerts an upward pull on the rear edge portion of the movable blade which, due to the loose pivotal connection of the movable blade to the stud 6, causes a tilting or canting of the blades, and at the same time, pushes the cutting edge of the movable blade against the edge of the fixed blade. The inclined pivot pin 25 causes the actuating lever to be tilted forwardly or away from the handle which, in turn, through the connection 12 with the blade, tends to swing the movable blade against the fixed blade and thereby insure unusually great force of engagement between the cutting edges of the blades at the tips thereof, and at the same time, the end of the actuating lever connected to the linkage 13 is pulled downwardly so that the other end is pulled upwardly in such a manner as to cant or tilt the movable blade. The pressure of the spring 16 against the movable blade increases as the handle portions are squeezed together, thereby to further enhance the shearing operation.

It will also be observed that by simply pulling the small end of the conical spring 16 out of the socket 18 of the arm 4a of the second handle, the parts on the pivot stud can be easily and quickly removed and separated for inspection, repair, or replacement. Similarly, the parts can be easily re-applied to the stud after which the spring can be slipped over the stud, compressed and snapped into the socket 18, thereby eliminating the necessity for nuts and screws and tools that would be required to manipulate them. The spring constantly presses the movable blade against the stationary blade, the pressure increasing during a shearing operation as the blades come together and decreasing as the operating handle is released so that the blades can quickly swing apart with only slight friction between them.

While the invention has been shown and described as embodied in certain structural details, it will be understood by those skilled in the art that the construction of the shears may be modified and changed with the spirit and scope of the invention.

We claim:

1. Shears comprising a main section having a handle and a stationary blade rigidly connected at one end thereof to said handle, a movable blade having an opening, a pivot stud on said main section extending loosely through said opening, said blades having cooperative cutting edges, an operating handle pivotally mounted intermediate its ends on said main section with one end portion overhanging said stud, means connecting said operating handle to said blade including a part mounted and slidable on said stud above said movable blade for swinging said movable blade relative to the stationary blade, and a compression spring interposed between said part and said end of the operating handle biasing the latter in one direction, holding said movable blade and said part on said stud, and yieldingly pressing the movable blade against the stationary blade.

2. Shears as defined in claim 1 wherein said part is a lever pivotally mounted intermediate its ends on said stud with its ends pivotally connected respectively to said movable blade and to said operating handle.

3. Shears comprising a main section having a handle and a stationary blade rigidly connected at one end thereof to said handle, a movable blade having an opening, a pivot stud on said main section extending loosely through said opening, said blades having cooperative cutting edges, an operating handle pivotally mounted on said main section, means connecting said operating handle to said blade including a lever pivotally connected intermediate its ends to said stud in spaced relation to said stationary blade, said movable blade having an arm projecting rigidly toward said stationary blade and outwardly from its rear edge, and one end of said lever having a downwardly extending arm rockably connected to said arm on said movable blade, there being a connection between the other end of said lever and said operating handle providing for swinging of said movable blade relatively to said stationary blade and simultaneous canting of said movable blade toward the stationary blade.

4. Shears comprising a main section having a handle and a stationary blade rigidly connected at one end thereof to said handle, a movable blade having an opening, a pivot stud on said main section extending loosely through said opening, said blades having cooperative cutting edges, an operating handle pivotally mounted on said main section, means connecting said operating handle to said blade including a lever pivotally connected intermediate its ends to said stud in spaced relation to said stationary blade, said movable blade having an arm projecting rigidly toward said stationary blade and outwardly from its rear edge, and one end of said lever having a downwardly extending arm, said arms having notches and the other arm having lugs loosely seated in said notches providing a rockable connection of the movable blade to said lever, there being a connection between the other end of said lever and said operating handle providing for swinging of said movable blade relatively to said stationary blade and simultaneous canting of said movable blade toward the stationary blade.

5. Shears comprising a main section having a handle and a stationary blade rigidly connected at one end thereof to said handle, a movable blade having an opening, a pivot stud on said main section extending loosely through said opening, said blades having cooperative cutting edges, an operating handle pivotally mounted on said main section, means connecting said operating handle to said blade including a lever pivotally connected intermediate its ends to said stud in spaced relation to said stationary blade, said movable blade having an arm projecting rigidly toward said stationary blade and outwardly from its rear edge, and one end of said lever having a downwardly extending arm rockably connected to said arm on said movable blade, there being a pivot pin rigidly mounted in the other end of said lever inclined forwardly and laterally toward said stud, and linkage having its opposite ends pivotally connected respectively to said pivot pin and said operating handle, thereby providing for simultaneous swinging and canting of the movable blade relatively to the stationary blade.

6. Shears as defined in claim 1 wherein said overhanging end of the operating handle has a downwardly facing socket, and said spring in a helical coil with one end removably fitted over the end of said stud and the other end removably seated in said socket.

7. Shears as defined in claim 4 wherein said operating handle is pivotally mounted between its ends on said main section with one end overhanging said stud, said movable blade and said lever are slidable longitudinally of said stud, and there is a compression spring interposed between said lever and said overhanging end of the operating handle biasing the latter in one direction, holding said movable blade and said part on said stud, and yieldingly pressing the movable blade against the stationary blade.

8. Shears as defined in claim 3 wherein said rockable connection is disposed below the cutting edge of said movable blade.

9. Shears comprising a main section having a handle and a stationary blade rigidly connected at one end thereof to said handle, a movable blade having an opening, a pivot stud on said main section extending loosely through said opening, said blades having cooperative cutting edges, an operating handle pivotally mounted intermediate its ends on said main section with one end portion overhanging said stud, means connecting said operating handle to said blade for swinging said movable blade relative to the stationary blade, and means including a compression spring interposed between said movable blade and said end of the operating handle biasing the latter in one direction, holding said movable blade on said stud, and yieldingly pressing the movable blade against the stationary blade.

10. Grass shears comprising a main section having a horizontal blade terminating at its rear end in an upwardly and rearwardly extending primary handle rigidly connected thereto, a complementary handle pivotally connected to said primary handle for pivotal movement about a substantially horizontal pivot, a vertical pivot element connected to said main section and disposed forwardly of said horizontal pivot, a blade having an aperture slidably engaged on said pivot element for pivotal movement thereabout in shearing cooperation with said lower blade, connections between said pivoted blade and said complementary handle to operate the blades to closing position upon closing movement of said handles, said pivoted handle having an extension projecting forwardly into overlying relation with said pivot element and forming a downwardly-facing seat, and a coiled compression spring interposed between said seat and the upper surface of said pivoted blade and operable to bias said handle portions toward open position and simultaneously bias said upper and lower blades toward one another, whereby upon closing movement of said handles, the biasing force of said spring increases the force engaging said upper and lower blades.

11. Shears comprising a main section having a handle and a stationary blade rigidly connected at one end thereof to said handle, a movable blade having an opening, a pivot element connected to said main section and extending through said opening, said blades having cooperative cutting edges, an operating handle pivotally mounted intermediate its ends on said main section with one end portion overhanging said element, means connecting said operating handle to said blade for swinging said movable blade relative to the stationary blade, and means including a coiled compression spring interposed between said movable blade and said end of the operating handle biasing the latter in one direction, said spring encircling an end of said pivot element and yieldingly pressing the movable blade against the stationary blade.

12. Shears comprising a main section having a handle and a stationary blade rigidly connected at one end thereof to said handle, a movable blade having an opening, a pivot stud on said main section extending loosely through said opening, said blades having cooperative cutting edges, an operating handle pivotally mounted intermediate its ends on said main section with one end portion overhanging said stud, means connecting said operating handle to said blade for swinging said movable blade relative to the stationary blade, and means including a coiled compression spring encircling an end of said pivot stud and being interposed between said movable blade and said end of the operating handle biasing the latter in one direction, holding said movable blade on said stud, and yieldingly pressing the movable blade against the stationary blade, said end of said pivot stud being smaller than said opening in said movable blade whereby said movable blade may be removed from said main section by displacement over the end of the stud upon removal of the spring.

13. Grass shears comprising a main section having a horizontal blade terminating at its rear end in an upwardly and rearwardly extending primary handle rigidly connected thereto, a complementary handle pivotally connected to said primary handle for pivotal movement about a substantially horizontal pivot, a vertical pivot element connected to said main section and disposed forwardly of said horizontal pivot, a blade having an aperture slidably engaged on said pivot element for pivotal movement thereabout in shearing cooperation with said lower blade, connections between said pivoted blade and said complementary handle to operate the blades to closing position upon closing movement of said handles, said pivoted handle having an extension projecting forwardly into overlying relation with said pivot element and forming a downwardly-facing seat, and a coiled compression spring encircling an end of said pivot element and being interposed between said seat and the upper surface of said pivoted blade and operable to bias said handle portions towards open position and simultaneously bias said upper and lower blades toward one another, whereby upon closing movement of said handles, the biasing force of said spring increases the force engaging said upper and lower blades, said pivot element being smaller than said aperture in the upper blade whereby said upper blade may be removed by displacement over the end of said pivot element upon removal of said spring.

14. Shears comprising a main section having a handle and a stationary blade rigidly connected at one end thereof to said handle, a movable blade having an opening, a pivot stud on said main section extending loosely through said opening, said blades having cooperative cutting edges, an operating handle pivotally mounted intermediate its ends on said main section with one end portion overhanging said stud, means connecting said operating handle to said blade at a point below the cutting edge of said movable blade for swinging said movable blade relative to the stationary blade, and means including a compression spring interposed between said movable blade and said end of the operating handle biasing the latter in one direction, holding said movable blade on said stud, and yieldingly pressing the movable blade against the stationary blade.

15. Shears comprising a main section having a handle and a stationary blade rigidly connected at one end thereof to said handle, a movable blade having an opening, a pivot stud on said main section extending loosely through said opening, said blades having cooperative cutting edges, an operating handle pivotally mounted intermediate its ends on said main section with one end portion overhanging said stud, means connecting said operating handle to said blade including an arm fixed on the movable blade and extending downwardly to a point approximately below the plane of the cutting edge of said movable blade, and connecting means extending from the lower end portion of said arm to the operating handle for swinging the movable blade relative to the stationary blade, and means including a compression spring interposed between said movable blade and said end of the operating handle biasing the latter in one direction, holding said movable blade in said stud and yieldably pressing the movable blade against the stationary blade.

16. Shears comprising a main section having a handle and a stationary blade rigidly connected at one end thereof to said handle, a movable blade having an opening, a pivot stud on said main section extending loosely through said opening, said blades having cooperative cutting edges, an operating handle pivotally mounted intermediate its ends on said main section with one end portion overhanging said stud, means connecting said operating handle to said blade including an arm fixed to the movable blade and extending downwardly to a point approximately below the plane of the cutting edge of said movable blade, a lever connected with the lower end portion of said arm, and a link section extending from the lever to the operating handle for swinging the movable blade relative to the stationary blade, and means including a compression spring interposed between said movable blade and the operating handle biasing the latter in one direction, holding said movable blade on said stud and yieldably pressing the movable blade against the stationary blade.

References Cited in the file of this patent
UNITED STATES PATENTS
3,036,379     Katzfey _____ May 29, 1962